US009083257B2

(12) United States Patent
Tateno et al.

(10) Patent No.: US 9,083,257 B2
(45) Date of Patent: Jul. 14, 2015

(54) POWER CONVERSION CIRCUIT, MULTIPHASE VOLTAGE REGULATOR, AND POWER CONVERSION METHOD

(75) Inventors: Koji Tateno, Kanagawa (JP); Takahiro Nomiyama, Kanagawa (JP); Yoshinao Miura, Kanagawa (JP); Hideo Ishii, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 372 days.

(21) Appl. No.: 13/563,297

(22) Filed: Jul. 31, 2012

(65) Prior Publication Data
US 2013/0076322 A1 Mar. 28, 2013

(30) Foreign Application Priority Data

Sep. 22, 2011 (JP) .................. 2011-207777

(51) Int. Cl.
G05F 3/24 (2006.01)
H02M 3/158 (2006.01)
H02M 3/156 (2006.01)
H02M 3/157 (2006.01)
H02M 1/38 (2007.01)
(52) U.S. Cl.
CPC .............. *H02M 1/38* (2013.01); *H02M 3/1588* (2013.01); *Y02B 70/1466* (2013.01)

(58) Field of Classification Search
CPC ... H02M 3/1588; H02M 3/156; H02M 3/157; H02M 1/088
USPC .......................... 323/265, 271, 282–285, 351
See application file for complete search history.

(56) References Cited

U.S. PATENT DOCUMENTS

| 2006/0119340 A1* | 6/2006 | Tateishi ........................ 323/284 |
| 2010/0026263 A1* | 2/2010 | Moussaoui et al. ........... 323/283 |
| 2011/0157949 A1* | 6/2011 | Bahramian ................... 363/132 |
| 2011/0188218 A1* | 8/2011 | Hsing et al. .................. 361/772 |
| 2012/0001609 A1* | 1/2012 | Shiraishi et al. ............. 323/282 |
| 2012/0217942 A1* | 8/2012 | Kudo ............................ 323/271 |

FOREIGN PATENT DOCUMENTS

JP 2011-101217 A 5/2011

* cited by examiner

*Primary Examiner* — Timothy J Dole
*Assistant Examiner* — Sisay G Tiku
(74) *Attorney, Agent, or Firm* — Mattingly & Malur, PC

(57) ABSTRACT

Disclosed is a power conversion circuit that suppresses the flow of a through current to a switching element based on a normally-on transistor. The power conversion circuit includes a high-side transistor and a low-side transistor, which are series-coupled to each other to form a half-bridge circuit, and two drive circuits, which complementarily drive the gate of the high-side transistor and of the low-side transistor. The high-side transistor is a normally-off transistor. The low-side transistor is a normally-on transistor.

16 Claims, 11 Drawing Sheets

US 9,083,257 B2

POWER CONVERSION CIRCUIT, MULTIPHASE VOLTAGE REGULATOR, AND POWER CONVERSION METHOD

CROSS-REFERENCE TO RELATED APPLICATIONS

The disclosure of Japanese Patent Application No. 2011-207777 filed on Sep. 22, 2011 including the specification, drawings, and abstract is incorporated herein by reference in its entirety.

BACKGROUND

The present invention relates to a power conversion circuit, and more particularly to a power conversion circuit that is formed by a semiconductor device and includes a gate drive circuit for driving the gate of a transistor that functions as a switching element. The present invention also relates to a multiphase voltage regulator having the power conversion circuit, and to a power conversion method.

In a related art power conversion circuit, a power MOSFET (Metal-Oxide-Semiconductor Field-Effect Transistor) or an IGBT (Insulated Gate Bipolar Transistor) is used as a switching element that provides power conversion control. Meanwhile, a power MOSFET based on gallium nitride (GaN) (hereinafter referred to as the GaN transistor) has attracted attention in recent years because it exhibits a high switching speed. The GaN transistor is divided into two types depending on the magnitude of a threshold voltage Vth: a normally-on type and a normally-off type. A normally-on transistor has a threshold voltage of lower than 0 and turns on when its gate voltage and source voltage are on the same potential. A normally-off transistor has a threshold voltage of higher than 0 and turns off when its gate voltage and source voltage are on the same potential.

The normally-on transistor is superior to the normally-off transistor in switching performance. For example, the normally-on transistor has a lower gate capacitance than the normally-off transistor and can reduce an on-resistance and perform a high-speed switching operation. However, when turning off the normally-on transistor, it is necessary that a negative voltage lower than a ground potential (0 V) be supplied to its gate. Therefore, when driving the normally-on transistor, it is necessary to prepare a negative voltage source, namely, a circuit that generates a negative voltage by using a charge pump or the like.

A semiconductor device that uses a normally-on transistor as a switching element is described in Japanese Unexamined Patent Publication No. 2011-101217. The semiconductor device described in Japanese Unexamined Patent Publication No. 2011-101217 includes a high-side drive for driving the gate of a normally-on GaN transistor in accordance with the negative voltage source.

SUMMARY

The normally-on transistor excels in switching performance. However, if an unstable negative voltage is supplied to its gate, it may turn on.

FIG. 1 is a diagram illustrating the configuration of a power conversion circuit contemplated by the inventors of the present invention. The inventors have assumed that a normally-on N-type power transistor is used as a high-side transistor and as a low-side transistor. The power conversion circuit shown in FIG. 1 includes gate drive circuits 91, 92, a high-side transistor 95, a low-side transistor 96, and negative voltage sources 93, 94. The high-side transistor 95 and the low-side transistor 96 both function as a switching element in a half-bridge circuit.

The gate drive circuit 91 drives the gate of the high-side transistor 95 by using its output signal, which is obtained by amplifying its input signal (PWM (Pulse Width Modulation) signal). The gate drive circuit 91 includes a totem-pole circuit that operates, for example, while using a ground voltage GND as a high-potential power supply voltage and a first power supply voltage NVSS supplied from a negative voltage source as a low-potential power supply voltage. It is preferred that, for example, a CMOS (Complementary Metal Oxide Semiconductor) buffer be used as the gate drive circuit 91. The gate drive circuit 92 drives the gate of the low-side transistor 96 by using its output signal, which is obtained by amplifying its input signal (PWM signal). The gate drive circuit 92 includes a totem-pole circuit that operates, for example, while using the ground voltage GND as a high-potential power supply voltage and the first power supply voltage NVSS supplied from a negative voltage source as the low-potential power supply voltage. It is preferred that, for example, a CMOS buffer be used as the gate drive circuit 92.

A third power supply voltage VIN is supplied from a power supply (not shown) to the drain of the high-side transistor 95. The source of the high-side transistor 95 is coupled to the drain of the low-side transistor 96. The source of the low-side transistor 96 is grounded. The drain of the low-side transistor 96 is coupled to the source of the high-side transistor 95 through an output terminal. The output terminal is coupled to a load 90 through an inductor L.

As the employed configuration is as described above, the high-side transistor 95 and the low-side transistor 96 output a voltage to the load 90 in accordance with the third power supply voltage VIN and with the ground voltage GND by performing a switching operation in accordance with a voltage supplied to their gate.

In the power conversion circuit shown in FIG. 1, a negative voltage (first power supply voltage NVSS) lower than the ground potential is supplied from the negative voltage source 93 to the gate drive circuit 91 in order to drive the normally-on high-side transistor 95. Similarly, the negative voltage (first power supply voltage NVSS) is supplied from the negative voltage source 94 to the gate drive circuit 92 in order to drive the normally-on low-side transistor 96. For example, the first power supply voltage NVSS is generated in the negative voltage sources 93, 94 in accordance with a second power supply voltage VDD. Therefore, the first power supply voltage NVSS is unstable during a period during which the second power supply voltage VDD is unstable. The first power supply voltage NVSS is not generated in a stable manner, for instance, immediately after power on or when the power supply to a control circuit is shut off.

FIG. 2 is a timing diagram illustrating the relationship between the second power supply voltage VDD, the first power supply voltage NVSS, and a through current I flowing in a switching element (high-side transistor 95 and low-side transistor 96) that prevails when the power conversion circuit shown in FIG. 1 is turned on. Referring to FIG. 2, the second power supply voltage VDD remains unstable and increases to a predetermined value during the interval between time T1, at which the power turns on, and time T2. During such an interval, the first power supply voltage NVSS is at 0 V and the negative voltage sources 93, 94 remain inoperative because the second power supply voltage VDD has not reached the predetermined value. Thus, the normally-on high-side transistor 95 and low-side transistor 96 are both on. During the interval between time T1 and time T2, the third power supply voltage VIN supplied to the high-side transistor 95 increases with an increase in the second power supply voltage VDD. Therefore, the through current I derived from the third power supply voltage VIN begins to flow through the high-side transistor 95 and low-side transistor 96, which are on.

When the second power supply voltage VDD is stabilized at the predetermined value at time T2, the negative voltage sources 93, 94 start operating and the first power supply voltage NVSS (negative voltage) begins to decrease. However, before time T3 at which the first power supply voltage NVSS stabilizes at a predetermined value, the normally-on high-side transistor 95 and low-side transistor 96 may be both on. In such an instance, the through current I derived from the third power supply voltage VIN flows through the high-side transistor 95 and low-side transistor 96.

As described above, at a timing at which the first power supply voltage NVSS (negative voltage) is not sufficiently generated in the power conversion circuit shown in FIG. 1, both the high-side transistor 95 and low-side transistor 96 may be on to let a large through current flow. As the through current destabilizes the output voltage Vout of the power conversion circuit, the load 90 may break down. In addition, the power transistors 95, 96 may break down due to the heat generated by an enormous through current.

To solve the above problem, the present invention adopts the following means. Reference numerals and symbols are used under "DETAILED DESCRIPTION" to give technical descriptions of the means for the purpose of clarifying the relationship between the descriptions given under "WHAT IS CLAIMED IS" and the descriptions given under "DETAILED DESCRIPTION". However, the reference numerals and symbols are not intended to limitedly interpret the technical scope of the present invention defined under "WHAT IS CLAIMED IS".

A power conversion circuit according to an aspect of the present invention includes a high-side transistor (11) and a low-side transistor (12), which are series-coupled to each other to form a half-bridge circuit, and two drive circuits (21, 22), which complementarily drive the gate of the high-side transistor (11) and of the low-side transistor (12). The high-side transistor (11) is a normally-off transistor, whereas the low-side transistor (12) is a normally-on transistor. Power conversion devices (100, 100') provided by the present invention are preferably configured as a semiconductor device that is a resin-sealed package containing the high-side transistor (11), the low-side transistor (12), and gate drive circuits (200, 300) with the drive circuits (21, 22).

A power conversion method according to another aspect of the present invention is a power conversion method for a power conversion circuit having two drive circuits (21, 22) that complementarily drive the gate of a high-side transistor (11) and of a low-side transistor (12), which are series-coupled to each other to form a half-bridge circuit. The power conversion method includes the steps of: causing one of the two drive circuits (21) to turn off the high-side transistor (11) when the power supply voltage (VDD or NVSS) of at least one of the two drive circuits (21, 22) deviates from a predetermined value; and causing the two drive circuits (21, 22) to control the switching operation of the high-side transistor (11) and of the low-side transistor (12) in accordance with an input PWM (Pulse Width Modulation) signal when the power supply voltage agrees with the predetermined value.

When the present invention is applied to a power conversion circuit, it suppresses the flow of a through current to a switching element based on a normally-on transistor.

BRIEF DESCRIPTION OF THE DRAWINGS

Embodiments of the present invention will be described in detail based on the following figures, in which:

FIG. 2 is a timing diagram illustrating the relationship between a power supply voltage, a negative voltage, and a through current flowing in a switching element that prevails when the power conversion circuit shown in FIG. 1 is turned on;

FIG. 10 is a timing diagram illustrating an operation that the negative voltage monitoring circuit provided by the present invention performs upon power on;

DETAILED DESCRIPTION

Figure 1:
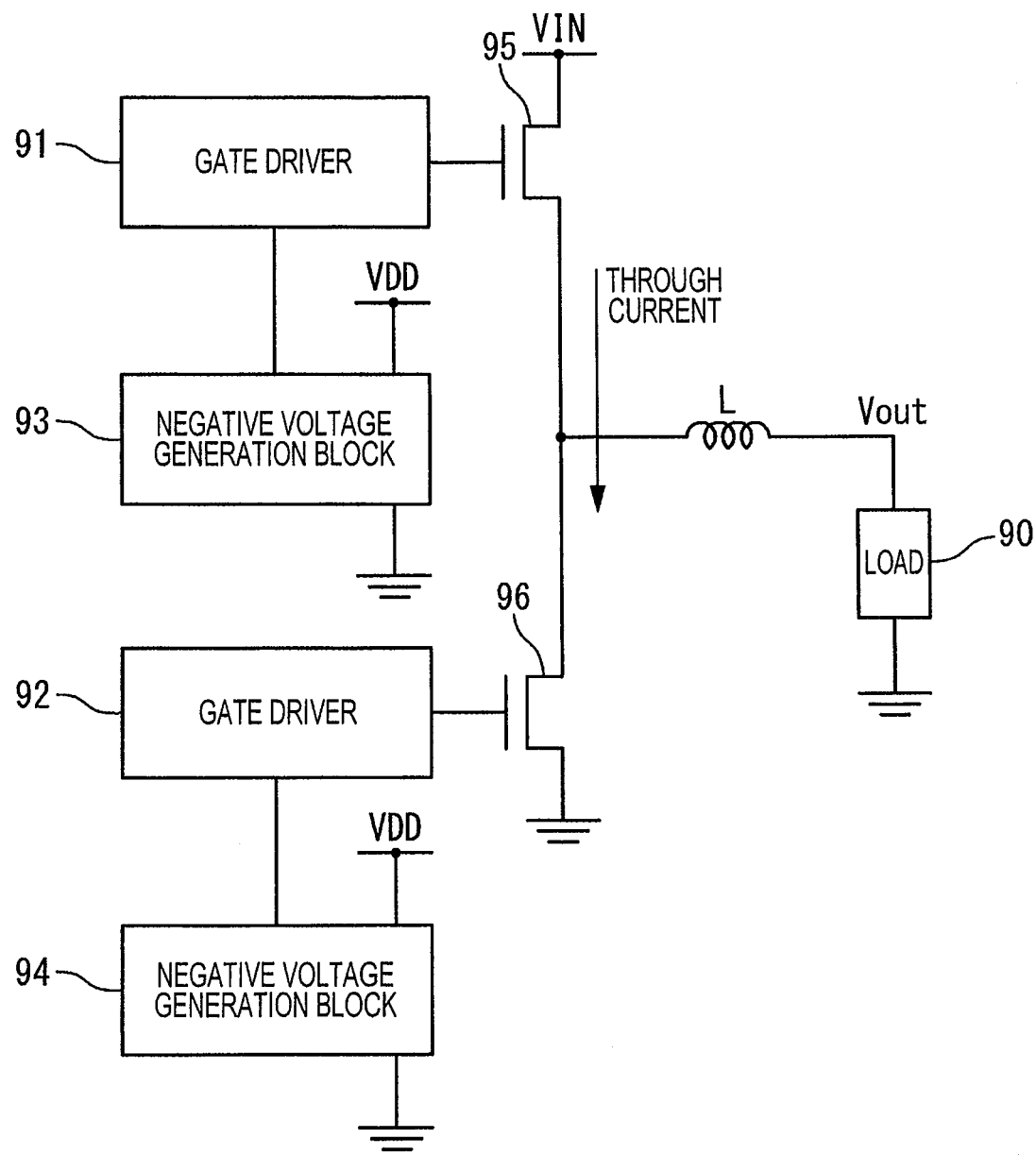
FIG. 1 is a diagram illustrating the configuration of power conversion circuit contemplated by the inventors of the present invention.

A power conversion circuit provided by the present invention uses a normally-off GaN transistor as a high-side transistor that forms a switching element for a half-bridge circuit. This ensures that the high-side transistor is off even while a negative voltage (first power supply voltage NVSS) is unstable. Therefore, the flow of a through current to the high-side transistor can be cut off. In the present invention, a normally-on GaN transistor, which excels in FOM (Figure Of Merit), is used as a low-side transistor while a normally-off GaN transistor is used as the high-side transistor. Therefore, the power conversion circuit provided by the present invention is capable of not only exhibiting switching characteristics suitable for high-speed operations, but also preventing the through current from being generated while the negative voltage (first power supply voltage NVSS) is unstable.

Embodiments of the present invention will now be described with reference to the accompanying drawings. In the drawings, the same or similar reference numerals denote the same, similar, or equivalent elements.

First Embodiment

The power conversion circuit according to a first embodiment of the present invention will now be described with reference to FIGS. 3 to 11.

Figure 3:
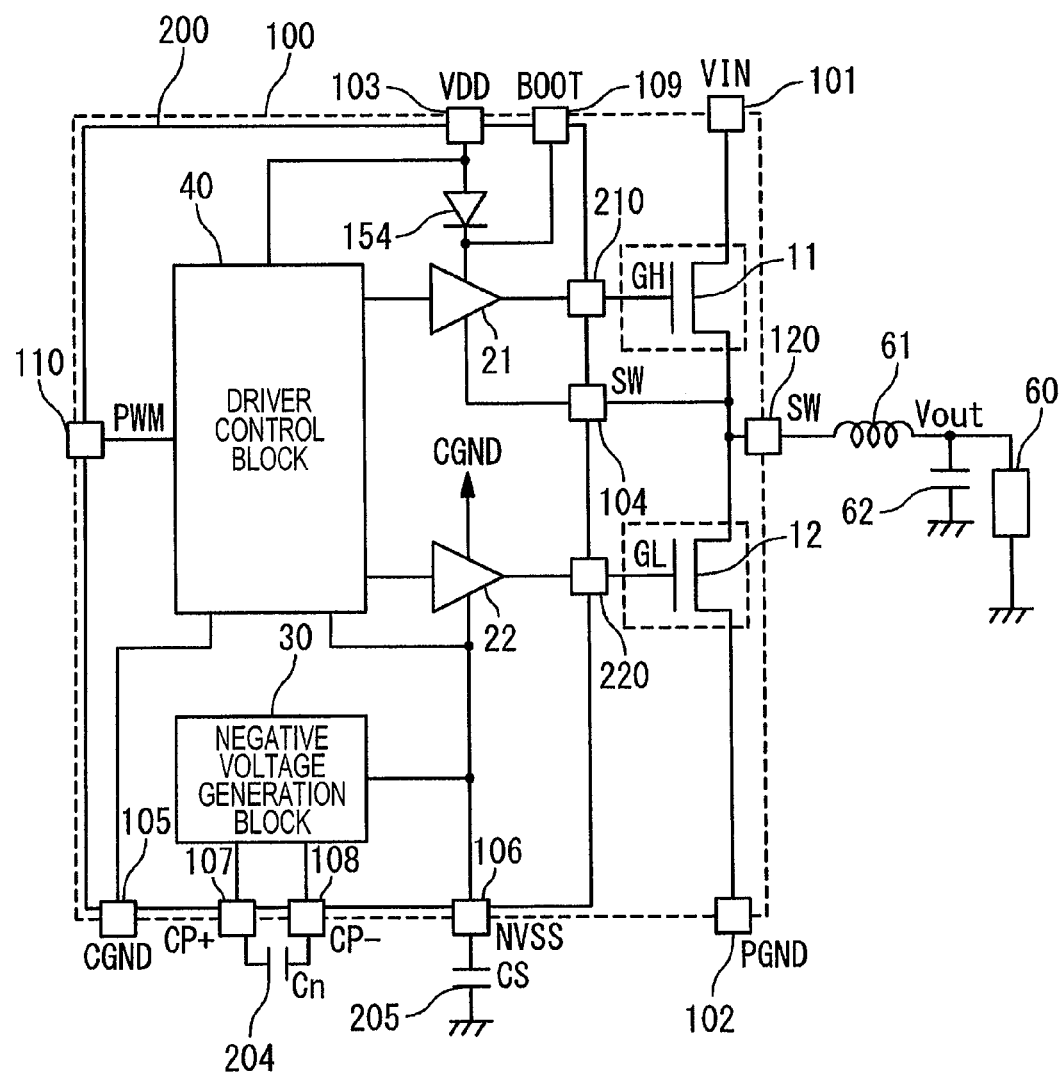
FIG. 3 is a diagram illustrating the configuration of the power conversion circuit according to a first embodiment of the present invention.
Figure 14:
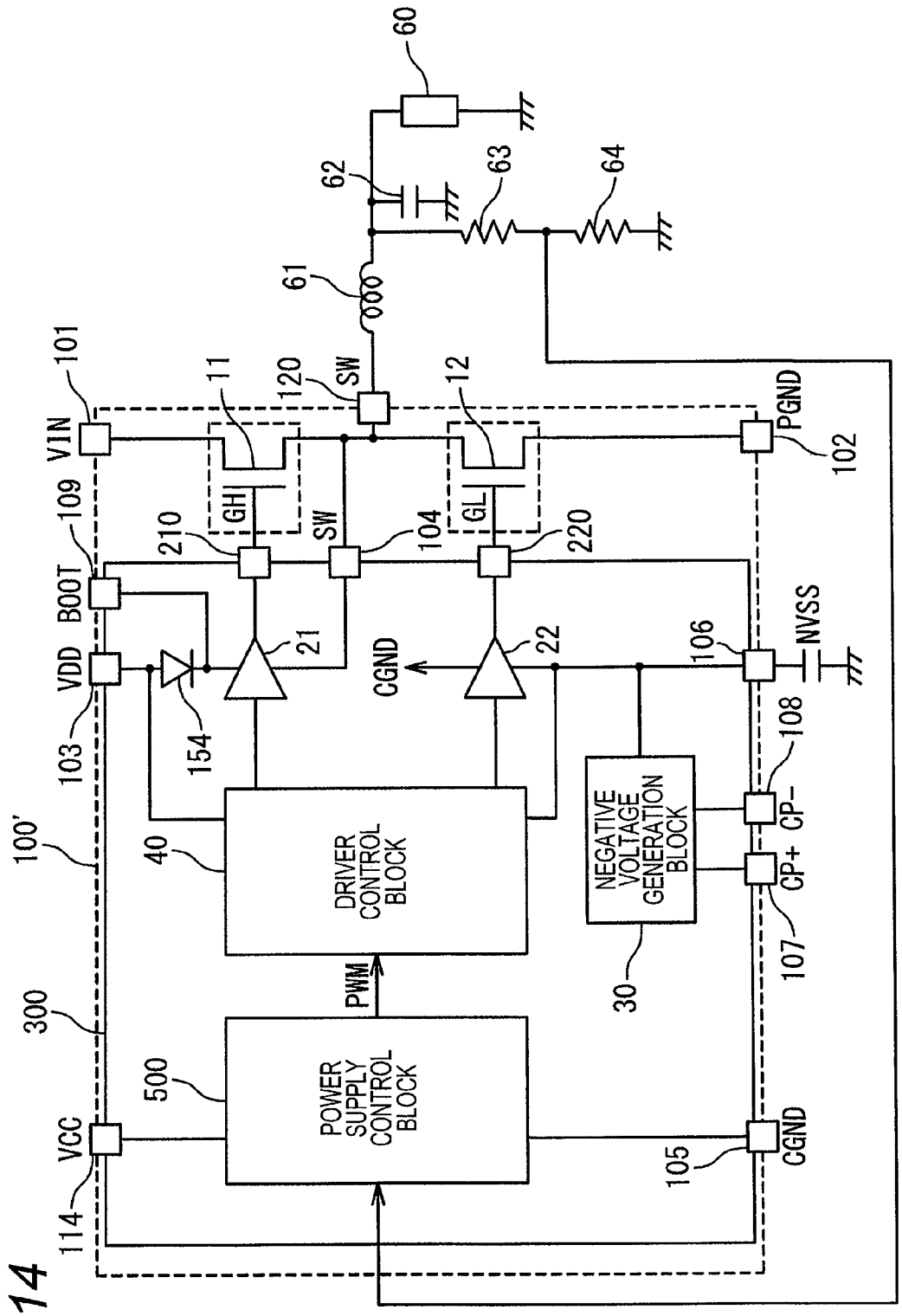
FIG. 14 is a diagram illustrating the configuration of a power conversion circuit according to a second embodiment of the present invention.

The power conversion circuit 100 according to the first embodiment of the present invention is described in detail below with reference to FIGS. 3 to 11. FIG. 3 is a diagram illustrating the configuration of the power conversion circuit according to the first embodiment of the present invention. Referring to FIG. 3, the power conversion circuit 100 according to the first embodiment includes a gate drive circuit 200 (driver IC), a high-side transistor 11, and a low-side transistor 12. The high-side transistor 11 and the low-side transistor 12 function as a switching element for a half-bridge circuit. More specifically, the source-drain path of the high-side transistor 11 is series-coupled to the source-drain path of the low-side transistor 12. In the first embodiment, the gate drive circuit 200 includes drive circuits 21, 22, a negative voltage generation block (hereinafter referred to as the negative voltage source 30), and a driver control block (hereinafter referred to as the driver control circuit 40), and drives the high-side transistor 11 and the low-side transistor 12. In the first embodiment, it is preferred that each of the gate drive circuit 200, the high-side transistor 11, and the low-side transistor 12 be formed, for instance, on a semiconductor substrate (chip) and integrated into a single chip. It is also preferred that the one-chip gate drive circuit 200, the one-chip high-side transistor 11, and the one-chip low-side transistor 12 be respectively mounted in three chip mounting regions (tabs) provided for the same lead frame and configured as one resin-sealed semiconductor device. In other words, it is preferred that the power conversion circuit 100 provided by the present invention be integrated into a single module as an SiP (System in Package) semiconductor device having three semiconductor chips. It should be noted that the power conversion circuit 100 shown in FIG. 3, the power conversion circuit 100 shown in FIG. 8, and the power conversion circuit 100' shown in FIG. 14 are also integrated into a single module as an SiP (System in Package) semiconductor device.

As the high-side transistor 11 provided by the present invention, a normally-off n-channel GaN transistor is preferably used because it can be forcibly turned off even while the negative voltage is unstable. Further, from the viewpoint of switching performance, a normally-on n-channel GaN transistor is preferably used as the low-side transistor 12.

A third power supply voltage VIN is supplied to the drain of the high-side transistor 11 through an input power supply terminal 101 (VIN). The source of the high-side transistor 11 is coupled to the drain of the low-side transistor 12 through an output terminal 120 (SW). The source of the low-side transistor 12 is grounded through a power ground terminal 102 (PGND). The drain of the low-side transistor 12 is coupled to the source of the high-side transistor 11 through the output terminal 120 (SW) and an output node 104. The output terminal 120 (SW) is coupled to a load 60 (e.g., CPU) through an output coil 61. An output capacitor 62 is parallel-coupled to the output coil 61 and to the load 60.

The drive circuit 21 drives the gate of the high-side transistor 11 in accordance with a signal output from the driver control circuit 40. The drive circuit 21 includes a totem-pole circuit that operates by using the second power supply voltage VDD supplied from a driver power supply terminal 103 (VDD) or a voltage supplied from a boot terminal 109 (BOOT) as a high-potential power supply voltage and by using an output voltage SW supplied from the output node 104 as the low-potential power supply voltage. The drive circuit 21 shown in FIG. 3 is, for example, a CMOS (Complementary Metal Oxide Semiconductor) buffer and outputs an input signal, as a gate drive signal GH, to the gate of the high-side transistor 11 through an output node 210. The drive circuit 22 drives the gate of the low-side transistor 12 in accordance with a signal output from the driver control circuit 40. The drive circuit 22 includes a totem-pole circuit that operates by using a ground voltage CGND supplied from a control ground terminal 105 as a high-potential power supply voltage and by using a negative voltage (first power supply voltage NVSS) supplied from the negative voltage source 30 as the low-potential power supply voltage. The drive circuit 22 shown in FIG. 3 is, for example, a CMOS buffer and outputs an input signal, as a gate drive signal GL, to the gate of the low-side transistor 12 through an output node 220. The high-potential power supply voltage to be supplied to the drive circuit 22 need not always be a ground voltage GND. Any voltage may be used as the high-potential power supply voltage to be supplied to the drive circuit 22 as far as it can turn on a normally-off transistor.

Figure 4:
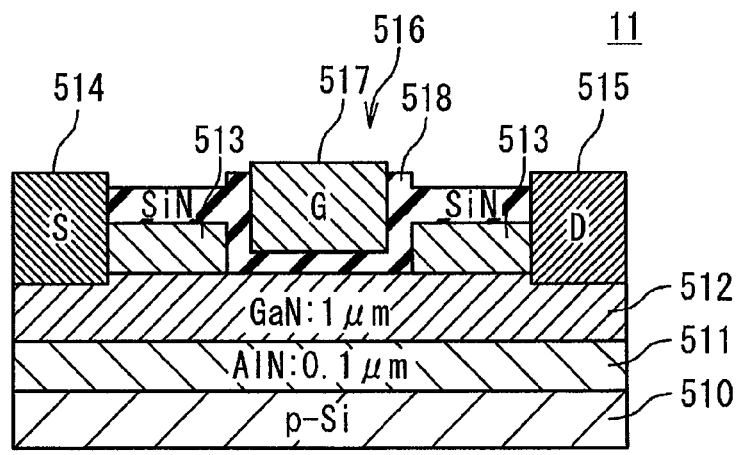
FIG. 4 is a cross-sectional view of an exemplary structure of a normally-off GaN transistor that is used as a high-side transistor in the present invention.

Normally-on GaN transistors are frequently used because they generally exhibit better performance and have a simpler structure than normally-off GaN transistors. However, a normally-off transistor can be used as a GaN transistor when it employs a recess gate structure as shown in FIG. 4. In the present invention, a normally-off GaN transistor is used as the high-side transistor 11.

FIG. 4 is a cross-sectional view of an exemplary structure of a normally-off GaN transistor that is used as the high-side transistor 11. As an example, the structure of a normally-off GaN transistor having the recess gate structure is described below. Referring to FIG. 4, the high-side transistor 11 includes an AlN layer 511 and a GaN layer 512 that are positioned over a silicon substrate 510. The AlN layer 511 is positioned below the GaN layer 512. An AlGaN layer 513, a source electrode 514, and a drain electrode 515 are positioned over the GaN layer 512. A recess 516 is formed in the AlGaN layer 513. The gate electrode 517 is positioned in the recess 516 and formed over the GaN layer 512 with a SiN film 518 placed between the gate electrode 517 and the GaN layer 512. In other words, as only the gate portion of the an AlGaN/GaN laminated structure is recess-etched, the high-side transistor 11 has a metal (gate electrode 517)/gate insulation film (SiN film 518)/GaN (GaN layer 512) MIS (Metal Insulator Semiconductor) gate structure.

The AlN layer 511 is a buffer layer having a thickness, for instance, of 0.1 μm. The GaN layer 512 is an electron transit layer having a thickness, for instance, of 1 μm. The AlGaN layer 513 is an electron supply layer that has a greater band gap energy than the GaN layer 512. The AlGaN layer 513 contains, for example, 22 percent aluminum and 78 percent gallium. A two-dimensional electron gas (2DEG) is generated at the interface between the GaN layer 512 and the AlGaN layer 513 and moves within the GaN layer 512 as a carrier. The SiN film 518 functions as a cap layer that covers the GaN layer 512 and the AlGaN layer 513.

Because of the recess gate structure, the AlGaN layer 513 over the GaN layer 512 near the gate electrode 517 decreases (to 0 in the present case) in thickness. The GaN layer 512 is usually designed to be close to an intrinsic semiconductor. Therefore, when no gate voltage is applied (VH=0 V), an "off" state occurs because channel formation does not take place due to a depletion layer extended to the GaN layer 512 directly below the gate electrode 517. When, on the other hand, an adequate positive voltage is applied to the gate electrode 517, an "on" state occurs because an accumulation-layer channel is formed directly below the gate to couple an electron accumulation layer between the source and the gate and between the gate and the drain. As described above, the recess gate structure provides normally-off characteristics. In the example shown in FIG. 4, it is assumed that the thickness of the AlGaN layer 513 directly below the gate is zero. Alternatively, however, any thickness may be employed as far as the normally-off characteristics are implemented.

Figure 5:
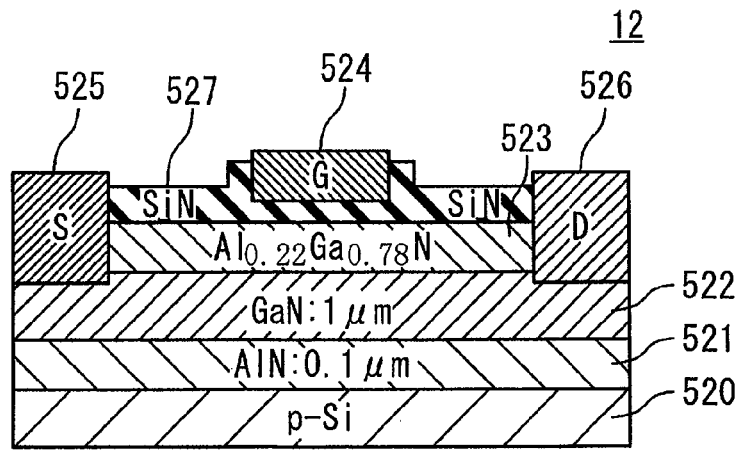
FIG. 5 is a cross-sectional view of an exemplary structure of a normally-on GaN transistor that is used as a low-side transistor in the present invention.

FIG. 5 is a cross-sectional view of an exemplary structure of a normally-on GaN transistor that is used as the low-side transistor 12. As an example, the structure of a GaN HFET (Heterostructure Field-Effect Transistor) having a planar gate structure is described below. Referring to FIG. 5, the low-side transistor 12 includes an AlN layer 521 and a GaN layer 522 that are positioned over a silicon substrate 520. The AlN layer 521 is positioned below the GaN layer 522. An AlGaN layer 523, a source electrode 525, and a drain electrode 526 are positioned over the GaN layer 522. A recess 516 is formed in the AlGaN layer 513. A gate electrode 524 is formed over the AlGaN layer 523 a SiN film 527 placed between the gate electrode 524 and the AlGaN layer 523.

The AlN layer 521 is a buffer layer having a thickness, for instance, of 0.1 µm. The GaN layer 522 is an electron transit layer having a thickness, for instance, of 1 µm. The AlGaN layer 523 is an electron supply layer that has a greater band gap energy than the GaN layer 522. The AlGaN layer 523 contains, for example, 22 percent aluminum and 78 percent gallium. A two-dimensional electron gas (2DEG) is generated at the interface between the GaN layer 522 and the AlGaN layer 523 and moves within the GaN layer 522 as a carrier. The SiN film 527 functions as a cap layer that covers the GaN layer 522 and the AlGaN layer 523.

In the planar gate structure, low on-resistance unique to a GaN transistor is achieved by using a high mobility, high density, two-dimensional electron gas that is induced at the heterointerface of the AlGaN/GaN laminated structure. Meanwhile, carrier electrons significantly tend to accumulate at this semiconductor interface. Therefore, while no voltage is applied to the gate (VH=0 V), the "on" state occurs because the carrier electrons accumulate directly below the gate electrode 524. However, the "off" state can be invoked by applying a negative bias to the gate electrode 524 to deplete the carrier electrons at the heterointerface directly below the gate electrode 524. As described above, the transistor having a planar structure exhibits normally-on characteristics. Therefore, to turn off the low-side transistor 12, which is a normally-on transistor, it is necessary that a negative voltage lower than the ground voltage (GND) be supplied to the gate.

The structure of the high-side transistor 11 and of the low-side transistor 12 and the composition of the AlGaN layer are not limited to those described above. It is obvious that GaN transfers having a different structure and a different composition may be used. For example, a design can be made to obtain a threshold value of −5 V or higher by controlling the Al composition and thickness of the AlGaN layer and the thickness of the gate insulation film. Alternatively, a normally-on transistor may be implemented by forming an FET on the (10-12) plane of a sapphire substrate in such a manner as to avoid the formation of a polarization field in the crystal growth direction of a nitride semiconductor. Further, a JFET (Junction Field Effect Transistor) that forms a p-type GaN layer directly below the gate may be used as the high-side transistor 11.

In the present invention, a switch exhibiting a lower loss and a lower capacitance than a normal Si transistor can be configured by using GaN transistors as the high-side transistor 11 and the low-side transistor 12. Consequently, the switching loss in the power conversion circuit 100 (e.g., DC/DC converter) can be substantially reduced to provide an increased switching frequency and achieve device downsizing. Further, in the present invention, the gate drive circuit 200 (driver IC) and the switching elements (high-side transistor 11 and low-side transistor 12) are integrated into a single module. In this instance, parasitic inductance is small due to a short inter-switch distance. This provides an increased switching frequency and permits a higher-speed operation.

Figure 6:
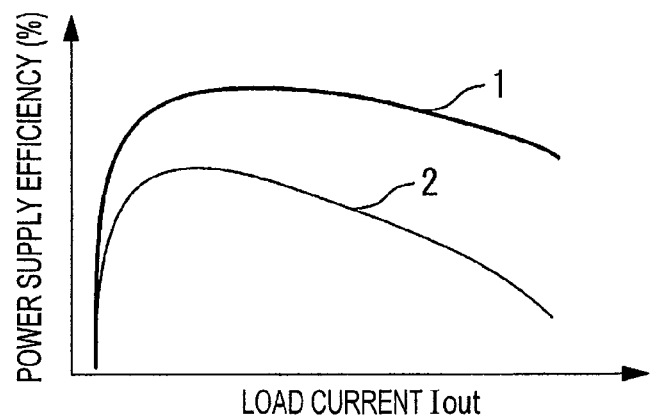
FIG. 6 is a diagram showing a comparison between the power supply efficiency of a Si device and that of a GaN transistor used for a switching element provided by the present invention.

FIG. 6 is a diagram showing a comparison between the power supply efficiency of a Si device and that of a GaN transistor used for the switching elements provided by the present invention. FIG. 6 shows effects produced when the power conversion circuit 100 is operated at a switching frequency as high as approximately 2 MHz. A solid line 1 indicates the power supply efficiency relative to a load current when a GaN transistor is used as the high-side transistor 11 and as the low-side transistor 12. A solid line 2 indicates the power supply efficiency relative to the load current when a Si device is used as the high-side transistor 11 and as the low-side transistor 12. As shown in FIG. 6, it is evident that the GaN transistor has a low capacitance and provides substantially higher power supply efficiency than a related art Si transistor.

In general, normally-off GaN transistors have a more complex structure and exhibit a higher element resistance value than normally-on GaN transistors. However, when the entire loss in the power conversion circuit 100 is considered, the resistive loss in the high-side transistor 11 is lower than that of the low-side transistor 12. Therefore, even when a normally-off GaN transistor exhibiting a higher resistance than the high-side transistor 11 is used, there is a slight increase in the entire loss in the power conversion circuit 100. Further, the resistive loss, which is a main factor contributing to the loss in the power conversion circuit 100, can be decreased when a normally-on transistor exhibiting a lower resistance than a normally-off transistor is used as the low-side transistor 12.

The high-side transistor 11 provided by the present invention is a normally-off transistor. Therefore, even when the second power supply voltage VDD is uncertain, the high-side transistor 11 is off. This prevents a through current from being generated by the third power supply voltage VIN.

Meanwhile, the low-side transistor 12 is coupled to the power ground terminal 102 (PGND) and to the output terminal 120 (load 60 side). Therefore, even when the low-side transistor 12 is on, a reflux current merely flows between the power ground terminal 102 (PGND) and the load 60 side as far as the high-side transistor 11 is off. The reflux current is not large enough to cause element destruction. Consequently, when a normally-off transistor is used as the high-side transistor 11, a normally-on GaN transistor exhibiting a low resistance, which is characteristic of GaN transistors, can be used as the low-side transistor 12.

In the present embodiment, a group III nitride semiconductor, which is exemplified by a GaN transistor, is used as the high-side transistor 11 and as the low-side transistor 12. However, the present invention is not limited to the use of a group III nitride semiconductor. Alternatively, a similar combination of SiC or other compound semiconductors (a normally-off type for the high-side transistor 11 and a normally-on type for the low-side transistor 12) may be used for the present invention.

Figure 2:
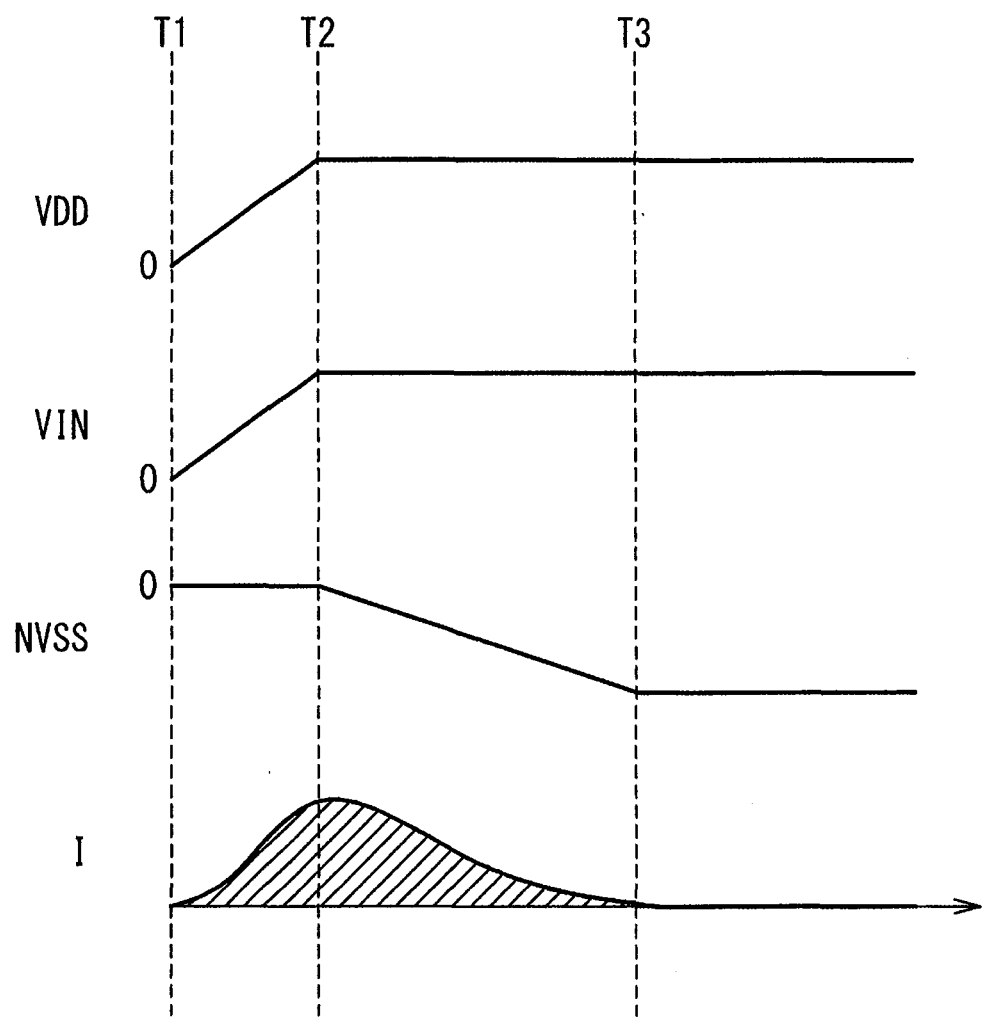
Figure 7:
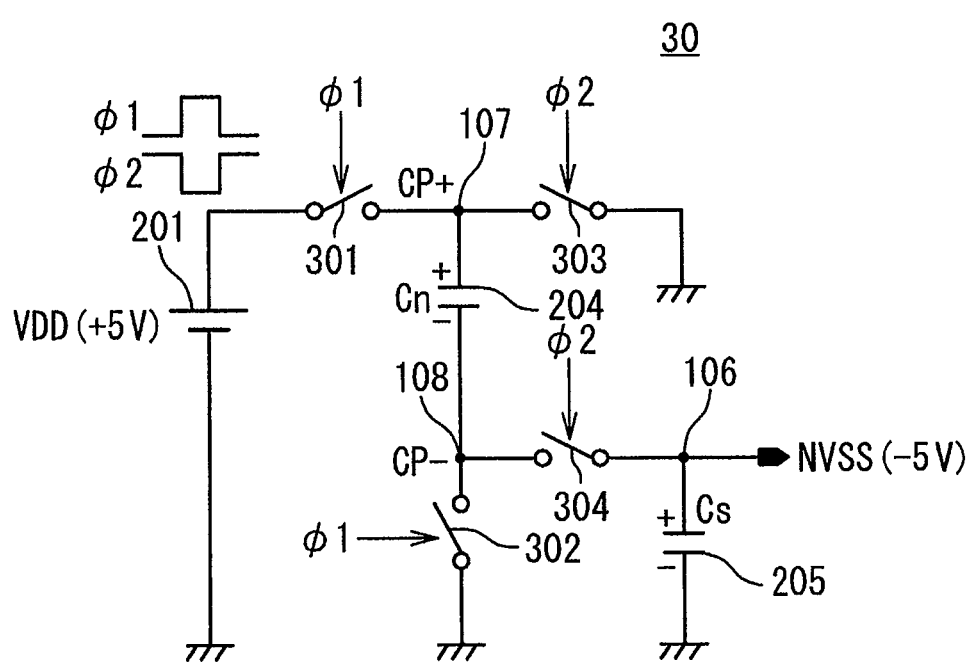
FIG. 7 is a diagram illustrating an exemplary configuration of a negative power supply provided by the present invention.

As shown in FIG. 2, the negative voltage source 30 generates a negative voltage (a first power supply voltage NVSS of, for instance, −5 V) that is lower than the ground voltage CGND (0 V). The negative voltage source 30 is coupled to a capacitor 204 (Cn) through a terminal 107 (CP+) and a terminal 108 (CP−), and coupled to a capacitor 205 (Cs) through a terminal 106. FIG. 7 is a diagram illustrating an exemplary configuration of the negative voltage source 30. The negative voltage source 30 is formed, for instance, by a step-down charge pump shown in FIG. 7, and includes switches 301-304. The switch 301 is coupled between a driver power supply 201 (a second power supply voltage VDD of, for instance, +5 V) and the terminal 107 (CP+) to control the coupling between the driver power supply 201 and one end of the capacitor 204 (Cn). The switch 302 is coupled between the terminal 108 (CP−) and a ground terminal (ground voltage GND) to control the coupling between the other end of the capacitor 204 (Cn) and the ground terminal. The switch 303 is coupled between the terminal 107 (CP+) and the ground terminal (ground voltage GND) to control the coupling between the ground terminal and one end of the capacitor 204 (Cn). The switch 304 is coupled between the terminal 107 (CP+) and the power supply terminal 106 to which the capacitor 205 (Cs) is coupled, and used to control the coupling between the other end of the capacitor 204 (Cn) and one end of the capacitor 205 (Cs).

Referring to FIG. 7, clock pulse signals Φ1, Φ2, which are complementary to each other, are input to the negative voltage source 30. While the clock pulse signal Φ1 is at a high level and the clock pulse signal Φ2 is at a low level, the switches 301, 302 are on and the switches 303, 304 are off. In this instance, the capacitor 204 (Cn) is charged. While the clock pulse signal Φ1 is at the low level and the clock pulse signal Φ2 is at the high level, the switches 301, 302 are off and the switches 303, 304 are on. In this instance, the capacitor 205 (Cs) is charged by an electrical charge stored in the capacitors 204, 205. This ensures that the voltage of a node (power supply terminal 106) coupling the capacitor 205 (Cs) to the switch 304 is a negative voltage (first power supply voltage NVSS) lower than the ground voltage CGND. When, for instance, the switch 301 is coupled to a +5 V driver power supply 201 (second power supply voltage VDD), the negative voltage source 30 generates a first power supply voltage NVSS of −5 V. The negative voltage source 30 need not always be implemented by a charge pump. It may alternatively be implemented by a step-down converter or the like as far as it supplies the first power supply voltage NVSS in a stable manner.

Referring to FIG. 3, the driver control circuit 40 is coupled to the driver power supply terminal 103 and to the control ground terminal 105, and outputs a signal, which has a logic level corresponding to a PWM signal input from an input terminal 110, to the drive circuits 21, 22. If the first power supply voltage NVSS is higher than a predetermined voltage (deviates from a predetermined value), the driver control circuit 40 outputs a signal at a low level ("0") to the drive circuits 21, 22 without regard to the PWM signal for the purpose of forcibly turning off the high-side transistor 11 and the low-side transistor 12. If, on the other hand, the first power supply voltage NVSS is lower than the predetermined voltage (is equal to the predetermined value), the driver control circuit 40 outputs a signal, which has a logic level corresponding to the PWM signal, to the drive circuits 21, 22.

Figure 8:
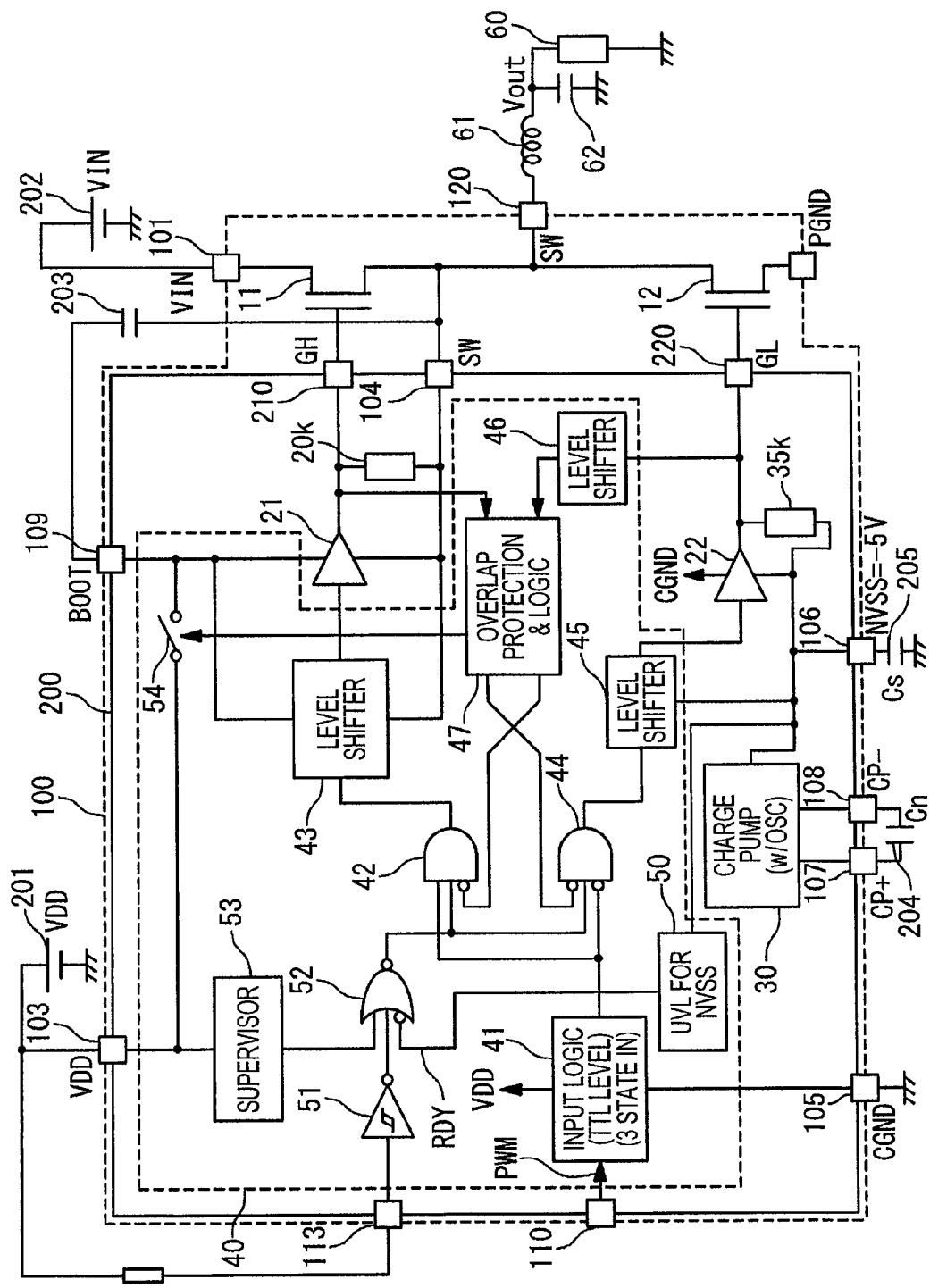
FIG. 8 is a diagram illustrating the details of an exemplary configuration of the power conversion circuit according to the first embodiment of the present invention.

An exemplary configuration of the power conversion circuit 100 according to the first embodiment of the present invention will now be described with reference to FIGS. 8 to 11. FIG. 8 is a diagram illustrating the details of an exemplary configuration of the power conversion circuit 100 shown in FIG. 3. FIG. 8 shows an exemplary configuration in which a DC/DC converter is used as the power conversion circuit 100.

Referring to FIG. 8, the driver control circuit 40 includes an input circuit 41, selective computation circuits 42, 44, 52, level shifters 43, 45, 46, an overlap protection circuit 47, a negative voltage monitoring circuit 50, an inverting buffer 51, a supervisor circuit 53, and a boot switch 54.

The negative voltage source 30, which is exemplified by the charge pump, supplies the negative voltage (first power supply voltage NVSS) to the power supply terminal 106 by charging the capacitor 204 (Cn) and the capacitor 205 (Cs) in accordance with the clock pulse signals Φ1, Φ2 output from an oscillation circuit (OSC) that is not shown.

The negative voltage monitoring circuit 50 monitors the magnitude of the first power supply voltage NVSS of the power supply terminal 106 and outputs a drive control signal RDY having a logic level corresponding to the result of monitoring. For example, if the first power supply voltage NVSS is higher than a predetermined voltage (reference voltage Vt), the negative voltage monitoring circuit 50 outputs the drive control signal RDY at the low level ("0"). If, on the other hand, the first power supply voltage NVSS is lower than the predetermined voltage (reference voltage Vt), the negative voltage monitoring circuit 50 outputs the drive control signal RDY at the high level ("1").

Figure 9:
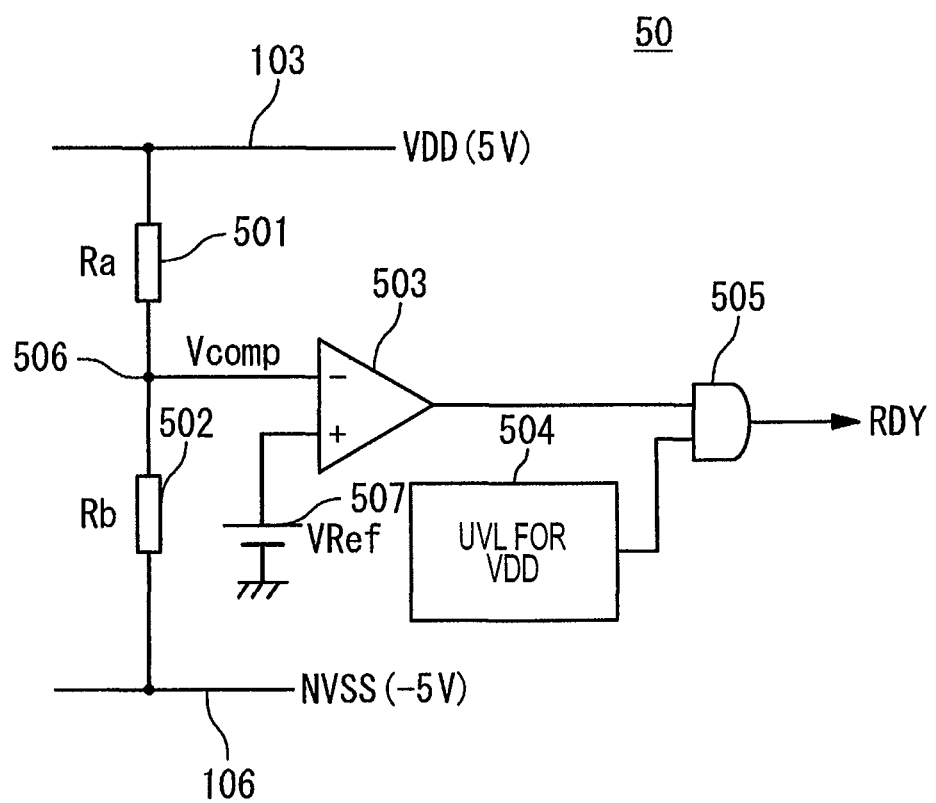
FIG. 9 is a diagram illustrating an exemplary configuration of a negative voltage monitoring circuit provided by the present invention.

FIG. 9 is a diagram illustrating an exemplary configuration of the negative voltage monitoring circuit 50 provided by the present invention. The negative voltage monitoring circuit 50 shown in FIG. 9 includes resistors 501 (Ra), 502 (Rb), a comparator 503, a low voltage detection circuit 504, and a logical operation circuit 505. The second power supply voltage VDD (e.g., +5 V) is supplied to one end of the resistor 501. The other end of the resistor 501 is coupled to a node 506 (an inverting input terminal of the comparator 503). The first power supply voltage NVSS is supplied to one end of the resistor 502. The other end of the resistor 502 is coupled to the node 506 (the inverting input terminal of the comparator 503). An non-inverting input terminal of the comparator 503 is coupled to a reference voltage source 507 (reference voltage Vref). The output of the comparator 503 is coupled to the input of the logical operation circuit 505. The low voltage detection circuit 504 is exemplified by a UVL (Under Voltage Lockout). This circuit 504 detects a decrease in the second power supply voltage VDD and outputs a signal having a logic level corresponding to the result of detection to the logical operation circuit 505. For example, if the second power supply voltage VDD is higher than a predetermined voltage (is equal to a predetermined value), the low voltage detection circuit 504 outputs a signal at the high level ("1"). If, on the other hand, the second power supply voltage VDD is lower than the predetermined voltage (deviates from the predetermined value), the low voltage detection circuit 504 outputs a signal at the low level ("0"). The logical operation circuit 505 outputs a drive control signal RDY indicative of the result of a logical operation performed on an output signal from the comparator 503 and on an output signal from the low voltage detection circuit 504. An AND gate is preferably used for the logical operation circuit 505 to output a drive control signal RDY indicative of the logical AND of the input signals.

In the negative voltage monitoring circuit 50, which is configured as shown in FIG. 9, the potential difference between the second power supply voltage VDD (e.g., +5 V) and the first power supply voltage NVSS (e.g., −5 V) is divided by the resistor 501 (Ra) and the resistor 502 (Rb). The comparator 503 then compares the resulting divided voltage Vcomp against the reference voltage Vref. If the divided voltage Vcomp, which is determined by the potential difference between the second power supply voltage VDD and the first power supply voltage NVSS and by the resistance ratio between the resistor 501 (Ra) and the resistor 502 (Rb), is lower than the reference voltage Vref, the comparator 503 outputs a signal at the high level ("1"). If, on the other hand, the divided voltage Vcomp is higher than the reference voltage Vref, the comparator 503 outputs a signal at the low level ("0"). In other words, if the first power supply voltage NVSS is higher than a predetermined voltage. (voltage Vt), the signal at the high level ("1") is input to the logical operation circuit 505. If, on the other hand, the first power supply voltage NVSS is lower than the predetermined voltage (voltage Vt), the signal at the low level ("0") is input to the logical operation circuit 505. Consequently, the logical operation circuit 505, that is, the negative voltage monitoring circuit 50, outputs the drive control signal RDY at the low level ("0") when the first power supply voltage NVSS is higher than the predetermined voltage (voltage Vt), and outputs the drive control signal RDY at the high level ("1") when the first power supply voltage NVSS is lower than the predetermined voltage (voltage Vt).

If the first power supply voltage NVSS is not fixed at a predetermined value (not higher than the voltage Vt), the negative voltage monitoring circuit 50 outputs the drive control signal RDY at a signal level that does not permit a switching operation (e.g., the low level ("0")) (fail-safe function). If, on the other hand, the first power supply voltage NVSS is fixed at the predetermined value (not higher than the voltage Vt), the negative voltage monitoring circuit 50 outputs the drive control signal RDY at a signal level that permits the switching operation (e.g., the high level ("1")).

Figure 10:
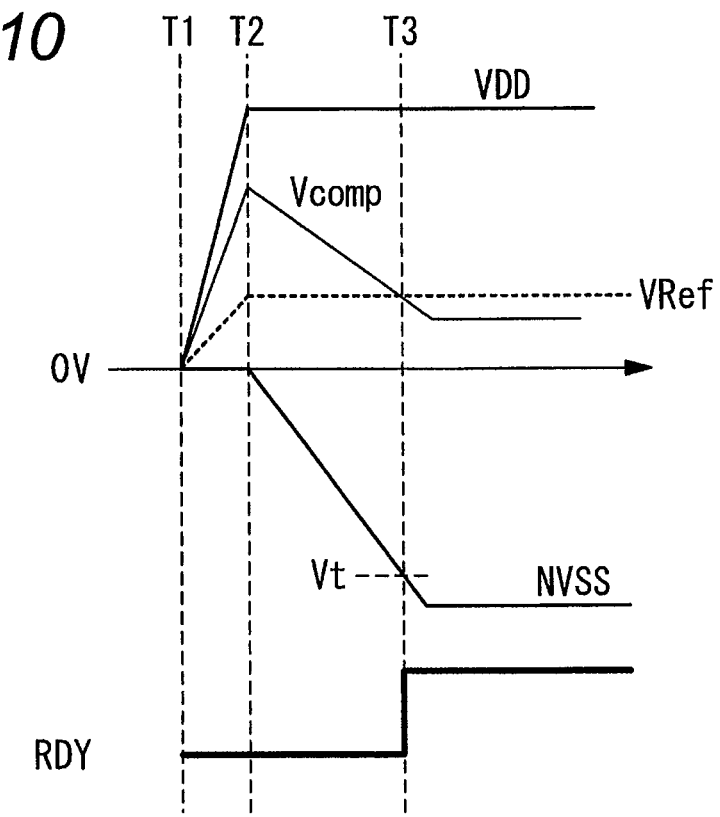

When, for instance, the second power supply voltage VDD is applied or cut off or an abnormality occurs in the negative voltage source 30, the first power supply voltage NVSS may exhibit an unstable value and rise above the predetermined value (voltage Vt). An example of an operation that is performed by the negative voltage monitoring circuit 50 when the first power supply voltage NVSS recovers from an unstable state and becomes stabilized at the predetermined value will now be described with reference to FIG. 10. FIG. 10 is a timing diagram illustrating an operation that the negative voltage monitoring circuit provided by the present invention performs upon power on.

Referring to FIG. 10, during the interval between time T1 at which the driver power supply (second power supply voltage VDD) for the power conversion circuit 100 is turned on and time T2, the second power supply voltage VDD exhibits an unstable value and rises to a predetermined value. During such an interval, the negative voltage source 30 does not operate because the second power supply voltage VDD has not reached a predetermined level, and the first power supply voltage NVSS is 0 V. The negative voltage monitoring circuit 50 outputs the drive control signal RDY at the low level ("0") because the divided voltage Vcomp is higher than the reference voltage Vref. Hence, the drive circuit 21 supplies the gate drive signal GH at the low level ("0") to the output node 210 (the gate of the high-side transistor 11) without regard to the value of the PWM signal, thereby forcibly turning off the high-side transistor 11. Meanwhile, the drive circuit 22 supplies the gate drive signal GL at the low level ("0") to the output node 220 (the gate of the low-side transistor 12) without regard to the value of the PWM signal, thereby forcibly turning off the low-side transistor 12. Before the value of the second power supply voltage VDD is fixed at the predetermined level, the output of the comparator 503 may be at the high level ("1") because, for example, the reference voltage Vref is not stabilized. During such a period, however, the output signal of the low voltage detection circuit 504 exhibits the low level ("0"). Therefore, the negative voltage monitoring circuit 50 outputs the drive control signal RDY at the low level ("0").

When the second power supply voltage VDD is stabilized at the predetermined value at time T2, the negative voltage source 30 starts operating so that the first power supply voltage NVSS begins to decrease. During the interval between time T2 and time T3 at which the divided voltage Vcomp is lower than the reference voltage Vref, the negative voltage monitoring circuit 50 outputs the drive control signal RDY at the low level ("0"). Hence, the drive circuit 21 supplies the gate drive signal GH at the low level ("0") to the output node 210 (the gate of the high-side transistor 11) without regard to the value of the PWM signal, thereby forcibly turning off the high-side transistor 11. Meanwhile, the drive circuit 22 supplies the gate drive signal GL at the low level ("0") to the output node 220 (the gate of the low-side transistor 12) without regard to the value of the PWM signal, thereby forcibly turning off the low-side transistor 12.

In the gate drive circuit 200 according to the present embodiment, the drive control circuit 40 operates so that the high-side transistor 11 and the low-side transistor 12 are forced to be off during the interval between time T1 at which the driver power supply (second power supply voltage VDD) is turned on and time T3 at which the first power supply voltage NVSS is lower than the reference voltage Vref. This prevents the through current, which may be generated by the third power supply voltage VIN, from flowing to the switching elements (high-side transistor 11 and low-side transistor 12) in the half-bridge circuit.

When the first power supply voltage NVSS is stabilized at the voltage Vt or lower after time T3, the divided voltage Vcomp decreases below the reference voltage Vref. Hence, the negative voltage monitoring circuit 50 outputs the drive control signal RDY at the high level ("1"). The drive circuits 21, 22 then enter a normal operation mode in which the gate drive signals GH, GL at a signal level corresponding to the signal level of the PWM signal are output to effect power conversion based on a switching operation.

The negative voltage monitoring circuit 50 may be configured as shown in FIG. 9. However, the negative voltage monitoring circuit 50 may have an alternative configuration as far as it detects whether the first power supply voltage NVSS has reached a predetermined level and outputs the drive control signal RDY indicative of the result of detection.

The drive control signal RDY output from the negative voltage monitoring circuit 50 is input to the drive circuits 21, through the selective computation circuits and the level shifters. Referring to FIG. 8, the drive control signal RDY is input to the selective computation circuit 52. An inversion of the drive control signal RDY, a disable signal output from the inverting buffer 51, and an output signal from the supervisor circuit 53 are input to the selective computation circuit 52. More specifically, the inverting buffer 51 inverts a logic value indicated by the voltage (second power supply voltage VDD) supplied to a disable terminal 113 coupled to the driver power supply 201, and outputs the disable signal indicative of the inverted logic value to the selective computation circuit 52. The supervisor circuit 53, which is exemplified by a UVL, outputs a signal to the selective computation circuit 52 to indicate whether the voltage (second power supply voltage VDD) supplied to the driver power supply terminal 103 is at a predetermined value (specified value). For example, the supervisor circuit 53 outputs a signal at the low level ("0") when the second power supply voltage VDD is higher than the predetermined value and outputs a signal at the high level ("1") when the second power supply voltage VDD is not higher than the predetermined value. The selective computation circuit 52 outputs the result of a logical operation performed on the input signals to the selective computation circuits 42, 44. The selective computation circuit 52 preferably uses a NOR gate and outputs the logical NOR of the input signals to the selective computation circuits 42, 44.

If the second power supply voltage VDD is not higher than the predetermined level (deviates from the predetermined value), a signal at the high level ("1") is input from the inverting buffer or the supervisor circuit 53 to the selective computation circuit 52. In this instance, the selective computation circuit outputs an output signal at the low level ("0") to the selective computation circuits 42, 44 without regard to the drive control signal RDY. If, on the other hand, the second power supply voltage VDD is at the predetermined level and supplied in a stable manner (is equal to the predetermined value), a signal at the low level ("0") is input from the inverting buffer 51 or the supervisor circuit 53 to the selective computation circuit 52. In this instance, the selective computation circuit 52 outputs a computation result corresponding to the inversion of a logic value indicated by the drive control signal RDY to the selective computation circuits 42, 44. For example, the selective computation circuit 52 outputs a signal at the high level ("1") when the drive control signal RDY is at the high level ("1") and outputs a signal at the low level ("0") when the drive control signal RDY is at the low level ("0"). Therefore, if the first power supply voltage NVSS is higher than the predetermined voltage Vt, the selective computation circuit 52 outputs a signal at the low level ("0"), which is indicative of such a first power supply voltage NVSS, to the selective computation circuits 42, 44. If, on the other hand, the first power supply voltage NVSS is lower than the predetermined voltage Vt, the selective computation circuit 52 outputs a signal at the high level ("1"), which is indicative of such a first power supply voltage NVSS, to the selective computation circuits 42, 44.

The input circuit 41 converts the PWM signal, which is input from the input terminal 110, to a TTL-level signal, and outputs the TTL-level signal to the selective computation circuits 42, 44. The overlap protection circuit 47 level-shifts the gate drive signal GH, which is output from the drive circuit 21, and then outputs the level-shifted signal to the selective computation circuit 44. In this instance, the gate drive signal GH is input to the selective computation circuit 44 after its logic level is inverted. Further, the overlap protection circuit 47 level-shifts the gate drive signal GL, which is output from the drive circuit 22, and then outputs the level-shifted signal to the selective computation circuit 42. In this instance, the gate drive signal GL is input to the selective computation circuit 42 after its logic level is inverted. This ensures that the "on" periods and "off" periods of the high- and low-side transistors 11, 12 do not overlap.

The selective computation circuit 42 inputs the PWM signal from the input circuit 41, the output signal from the selective computation circuit 52, and the inversion of the output signal from the overlap protection circuit 47, performs a logical operation on the input signals, and outputs the result of the logical operation to the level shifter 43. The selective computation circuit 42 preferably uses an AND gate and outputs the logical AND of the input signals. For example, if the first power supply voltage NVSS is higher than the predetermined voltage Vt or the second power supply voltage VDD has not reached the predetermined level, the selective computation circuit 42 outputs an output signal at the low level ("0") to the level shifter 43 without regard to the other input signals. If, on the other hand, the output signal from the selective computation circuit 52 is at the high level ("1"), that is, if the second power supply voltage VDD has reached the predetermined level and the first power supply voltage NVSS is lower than the predetermined voltage Vt, the selective computation circuit 42 outputs the logical AND of the inversion of the output signal from the overlap protection circuit 47 and the PWM signal to the level shifter 43.

The selective computation circuit 44 inputs the inversion of the PWM signal from the input circuit 41, the output signal from the selective computation circuit 52, and the inversion of the output signal from the overlap protection circuit 47, performs a logical operation on the input signals, and outputs the result of the logical operation to the level shifter 45. The selective computation circuit 44 preferably uses an AND gate and outputs the logical AND of the input signals. For example, if the output signal from the selective computation circuit 52 is at the low level ("0"), that is, if the first power supply voltage NVSS is higher than the predetermined voltage Vt or the second power supply voltage has not reached the predetermined level, the selective computation circuit 44 outputs an output signal at the low level ("0") to the level shifter 45 without regard to the other input signals. If, on the other hand, the output signal from the selective computation circuit 52 is at the high level ("1"), that is, if the second power supply voltage VDD has reached the predetermined level and the first power supply voltage NVSS is lower than the predetermined voltage Vt, the selective computation circuit 44 outputs the logical AND of the inversion of the output signal from the overlap protection circuit 47 and the PWM signal to the level shifter 45.

The lever shifter 43 converts a logic signal ranging in voltage from the second power supply voltage VDD level to the ground voltage CGND level to a logic signal ranging in voltage from the level of a voltage supplied from the boot terminal 109 to the output node voltage SW level.

The gate drive circuit 200 is provided with the boot terminal 109 (BOOT), which is coupled to the output node 104 (SW) through an external bootstrap capacitor 203. The drive circuit 12 and the level shifter 43 are coupled to the driver power supply terminal 103 (VDD) through the boot switch 54 and common-coupled to the boot terminal 109 (BOOT). The on/off operation of the boot switch 54 is controlled by the overlap protection circuit 47. The boot switch 54 may be replaced by a diode 154 shown in FIG. 3.

When the output voltage SW supplied to the output node 104 is at the low level ("0"), the overlap protection circuit 47 exercises control so that the boot switch 54 is on. The bootstrap capacitor 203 is then charged by the driver power supply 201. When, on the other hand, the output voltage SW is at the high level ("1"), the overlap protection circuit 47 exercises control so that the boot switch 54 is off. In this instance, the negative terminal (output node 104) of the bootstrap capacitor 203 is at the high level, that is, at the level of the third power supply voltage VIN. Hence, the potential of the positive terminal (boot terminal 109) of the bootstrap capacitor 203 rises above the third power supply voltage VIN. The drive circuit 21 operates by using the voltage supplied from the boot terminal 109 and the output voltage SW supplied to the output node 104 as the power supply voltage to drive the gate of the high-side transistor 11. Therefore, a stable power supply voltage is supplied to the drive circuit 21 no matter whether the high-side transistor 11 is on or off.

Figure 11:
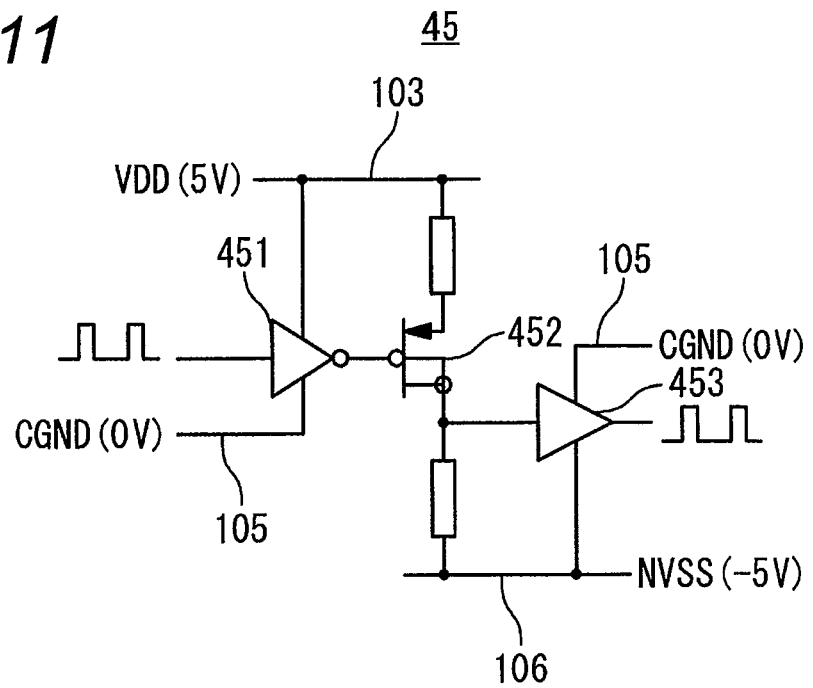
FIG. 11 is a diagram illustrating an example of a level shifter provided by the present invention.

The level shifter 45 converts a logic signal ranging in voltage from the second power supply voltage VDD level to the ground voltage CGND level to a logic signal ranging in voltage from the ground voltage CGND level to the first power supply voltage NVSS level. FIG. 11 is a diagram illustrating an exemplary configuration of the level shifter 45 provided by the present invention. Referring to FIG. 11, the level shifter 45 includes an inverting buffer 451, a p-channel MOS transistor 452, and a buffer 453. The inverting buffer 451 operates in accordance with the second power supply voltage VDD, which is supplied as the high-potential power supply voltage, and with the ground voltage CGND, which is supplied as the low-potential power supply voltage, inverts the logic level of an input signal, and outputs the resultant signal to the gate of the p-channel MOS transistor 452. The drain of the p-channel MOS transistor 452 is coupled to the input terminal of the buffer 453 and to the power supply terminal 106 (NVSS), whereas the source of the p-channel MOS transistor 452 is coupled to the driver power supply terminal 103 (VDD). In accordance with the level of a signal input to the gate, the p-channel MOS transistor 452 controls the coupling between either the driver power supply terminal 103 or the power supply terminal 106 and the input terminal of the buffer 453. The buffer 453 operates in accordance with the ground voltage CGND (0 V), which is supplied as the high-potential power supply voltage, and with the first power supply voltage NVSS, which is supplied as the low-potential power supply voltage, and outputs a signal at a signal level corresponding to an input signal to the drive circuit 22. As the above-described configuration is employed, the level shifter 45 converts the voltage range of a logic signal input from the selective computation circuit 44 to an operating voltage range of the drive circuit 22. The p-channel MOS transistor 452 is an element that can withstand the first power supply voltage NVSS and the second power supply voltage VDD.

The drive circuit 21 receives the signal output from the level shifter 43 and outputs the received signal to the output node 210 (the gate of the high-side transistor 11) and to the overlap protection circuit 47 as the gate drive signal GH. The drive circuit 22 receives the signal output from the level shifter 45 and outputs the received signal to the output node 220 (the gate of the high-side transistor 11) as the gate drive signal GL. The gate drive signal GL is input to the overlap protection circuit 47 through the level shifter 46.

Figure 12:
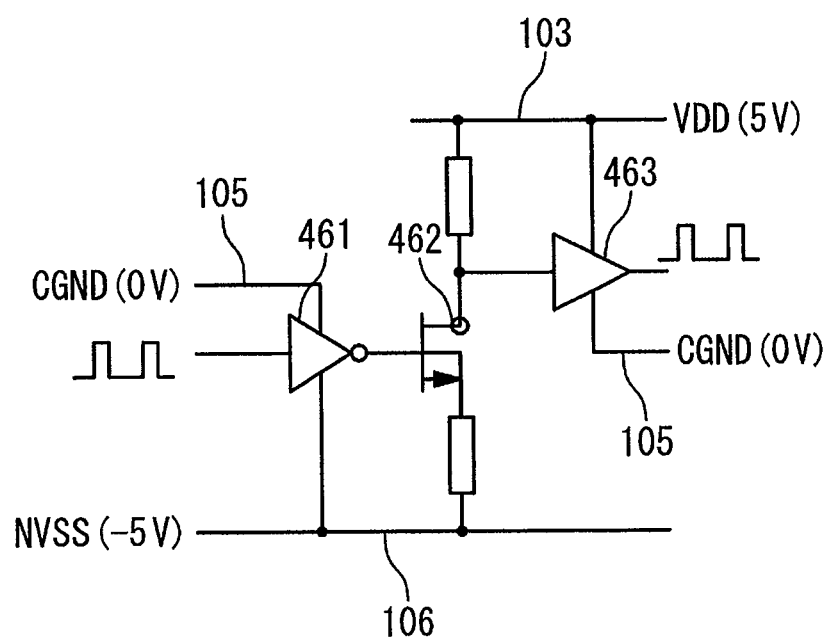
FIG. 12 is a diagram illustrating another example of the level shifter provided by the present invention.

The level shifter 46 converts a logic signal ranging in voltage from the ground voltage CGND level to the first power supply voltage NVSS level to a logic signal ranging in voltage from the second power supply voltage VDD level to the ground voltage CGND level. FIG. 12 is a diagram illustrating an exemplary configuration of the level shifter 46 provided by the present invention. Referring to FIG. 12, the level shifter 46 includes an inverting buffer 461, an n-channel MOS transistor 462, and a buffer 463. The inverting buffer 461 operates in accordance with the ground voltage CGND, which is supplied as the high-potential power supply voltage, and with the first power supply voltage NVSS, which is supplied as the low-potential power supply voltage, inverts the logic level of an input signal, and outputs the resultant signal to the gate of the n-channel MOS transistor 462. The drain of the n-channel MOS transistor 462 is coupled to the input terminal of the buffer 463 and to the driver power supply terminal 103 (VDD), whereas the source of the n-channel MOS transistor 462 is coupled to the power supply terminal 106 (NVSS). In accordance with the level of a signal input to the gate, the re-channel MOS transistor 462 controls the coupling between either the driver power supply terminal 103 or the power supply terminal 106 and the input terminal of the buffer 463. The buffer 463 operates in accordance with the second power supply voltage VDD, which is supplied as the high-potential power supply voltage, and with the ground voltage CGND, which is supplied as the low-potential power supply voltage, and outputs a signal at a signal level corresponding to an input signal to the overlap protection circuit 47. As the above-described configuration is employed, the level shifter 43 converts the voltage range of the gate drive signal GL to an operating voltage range of the overlap protection circuit 47 and of the selective computation circuits 42, 44. The n-channel MOS transistor 462 is an element that can withstand the second power supply voltage VDD and the first power supply voltage NVSS.

As the above-described configuration is employed, the gate drive circuit 200 provided by the present invention controls the switching operation of the high-side transistor 11 and of the low-side transistor 12 by outputting the gate drive signals GH, GL at a signal level corresponding to the PWM signal when the second power supply voltage VDD is stabilized at the predetermined level and the first power supply voltage NVSS is not higher than the predetermined voltage Vt, that is, when the second power supply voltage VDD and the first power supply voltage NVSS are equal to the predetermined values. When, on the other hand, the second power supply voltage VDD has not reached the predetermined level (deviates from the predetermined value) or the first power supply voltage NVSS is higher than the predetermined voltage Vt and unstable (deviates from the predetermined value), the gate drive circuit 200 forcibly turns off the high-side transistor 11 and the low-side transistor 12 to prevent the through current from being generated by the third power supply voltage VIN.

(Application Example of the Power Conversion Circuit According to the First Embodiment)

Figure 13:
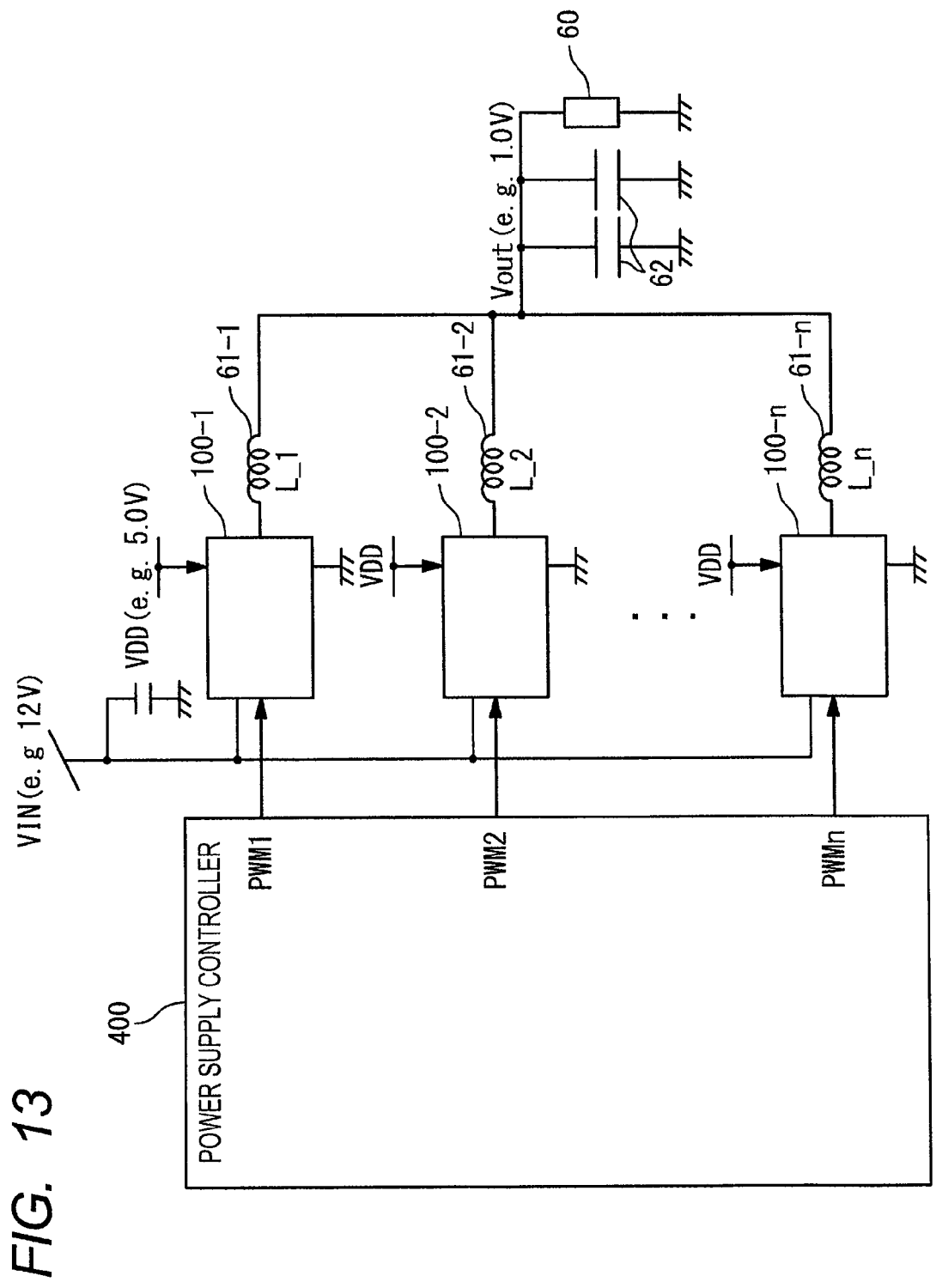
FIG. 13 is a diagram illustrating an exemplary configuration of a switching regulator that includes the power conversion circuit according to the first embodiment of the present invention.

FIG. 13 is a diagram illustrating an exemplary configuration of a multiphase voltage regulator (hereinafter referred to as the VR) that uses a power conversion technology according to the first embodiment of the present invention. The VR includes a plurality of power conversion circuits 100-1 to 100-n (n is an integer not smaller than 2) and a power supply controller 400. The power conversion circuits 100-1 to 100-n are parallel-coupled to a load 60 exemplified by a CPU or an MPU through a plurality of output coils 61-1 to 61-n. The power conversion circuits 100-1 to 100-n are configured a shown in FIG. 8 so that a voltage of −5 V is supplied as the second power supply voltage VDD (driver power supply voltage) whereas a voltage of +12 V is supplied as the third power supply voltage VIN (input voltage). The power conversion circuits 100-1 to 100-n each function, for instance, as a DC/DC converter and outputs an input voltage of +12 V to the load 60 as an output voltage Vout of +1.0 V.

The power supply controller 400 outputs PWM signals PWM1-PWMn, which respectively correspond to the power Conversion circuits 100-1 to 100-n. The power supply controller 400 controls the switching operations of the power conversion circuits 100-1 to 100-n by outputting the PWM signals PWM1-PWMn, which differ in phase.

When the power conversion circuits 100 are parallel-coupled and operated in different phases as described above, the current flowing to the power conversion circuits 100 can be distributed. This makes it possible to generate a large current output and provide high-load response characteristics.

In recent years, the operating voltage of an MPU is decreased with its current consumption increased. Further, as high-speed current changes occur in the MPU, an MPU power supply capable of generating a large current output and exhibiting high-load response characteristics is demanded. As the present invention uses GaN transistors as switching elements, it can offer an MPU power supply capable of satisfying such a demand and prevent a through current from being generated when the power supply voltage VDD and the negative voltage is not fixed. This makes it possible to supply electrical power to the MPU in a stable manner.

Second Embodiment

The power conversion circuit 100 according to the first embodiment is configured so that the high-side transistor 11, the low-side transistor 12, and the gate drive circuit 200 (driver IC) are integrated into a single module. Alternatively, however, such individual elements may be separately implemented to configure the power conversion circuit 100. Further, an alternative is to use a dedicated IC that includes the driver control circuit 40 and incorporates a controller function of generating PWM signals and controlling power conversion switching operations.

FIG. 14 is a diagram illustrating the configuration of a power conversion circuit according to a second embodiment of the present invention. Referring to FIG. 14, the power conversion circuit 100' according to the second embodiment includes a gate drive circuit 300 (controller IC), a high-side transistor 11, and a low-side transistor 12. The high- and low-side transistors 11, 12 function as switching elements for a half-bridge circuit. The gate drive circuit 300 according to the second embodiment includes drive circuits 21, 22, a negative voltage source 30, a driver control circuit 40, and a power supply control block 500 (hereinafter referred to as the power supply control circuit 500), and drives the high-side transistor 11 and the low-side transistor 12. In the present embodiment, it is preferred that each of the gate drive circuit 300, the high-side transistor 11, and the low-side transistor 12 be formed, for instance, on a semiconductor substrate (chip) and integrated into a single chip. It is also preferred that the one-chip gate drive circuit 200, the one-chip high-side transistor 11, and the one-chip low-side transistor 12 be respectively mounted in three chip mounting regions (tabs) provided for the same lead frame and configured as one resin-sealed semiconductor device. In other words, it is preferred that the power conversion circuit 100' provided by the present invention be integrated into a single module as an SiP (System in Package) semiconductor device having three semiconductor chips.

The configurations of the drive circuits 21, 22, negative voltage source 30, and driver control circuit 40 will not be described here because they are the same as those described in connection with the first embodiment. The power supply control circuit 500 operates in accordance with a power supply voltage VCC from a power supply terminal 114 and with a ground voltage GND from a ground terminal 115 to output a PWM signal to the driver control circuit 40. The driver control circuit 40 outputs an output signal, which is at a logic level according to the PWM signal, to the drive circuits 21, 22. Further, resistors 63, 64 are series-coupled to a coupling node between an output coil 61 and an output capacitor 62. A coupling node between the resistors 63, 64 is coupled to the power supply control circuit 500. This ensures that an output voltage VOUT, which is output from the power conversion circuit 100' to a load 60, is divided by the resistors 63, 64 and fed back to the power supply control circuit 500. The power supply control circuit 500 generates a PWM signal in accordance with the fed-back voltage and with an input signal (not shown) and outputs the PWM signal to the driver control circuit 40.

As described above, the power conversion circuits 100, 100' forcibly turn off the high-side transistor 11 and the low-side transistor 12 when the power conversion circuits 100, 100' are turned on, the system power is turned off, or the second power supply voltage VDD or the first power supply voltage NVSS is not raised to a predetermined level due, for instance, to a faulty negative voltage source. This makes it possible to prevent a through current from being generated by the third power supply voltage VIN and avoid damage to the load 60, to the high-side transistor 11, and to the low-side transistor 12. As the present invention makes it possible to avoid the through current even when the negative voltage (first power supply voltage NVSS) is unstable, a normally-on power transistor, particularly, a normally-on GaN transistor, which excels in FOM (Figure Of Merit), can be used as a switching element for a bridge circuit that functions as a power conversion circuit.

Further, a normally-on device usually requires that a negative voltage be applied to its gate. However, the complicatedness of a system can be reduced by incorporating a relevant negative voltage generation circuit (the negative voltage source 30 in the current example) into a dedicated driver IC.

While the preferred embodiments of the invention have been described in detail, the present invention is not limited to the specific embodiments described above. It is to be understood that variations and modifications of the present invention may be made without departing from the scope of the present invention.

In the first and second embodiments, an n-channel transistor is preferably used as the high-side transistor 11 and as the low-side transistor 12 because of high carrier mobility, low resistance, and low power loss. Alternatively, however, a p-channel transistor may be used as at least either the high-side transistor 11 or the low-side transistor 12. However, when a p-channel transistor is used as the high-side transistor 11, it is obvious that the drive control signal GH output to cut off the flow of the through current has a signal level that is an inverse of the signal level used in the foregoing embodiments.

In the foregoing embodiments, both the high-side transistor and the low-side transistor 12 are forcibly turned off in accordance with the second power supply voltage VDD or with the first power supply voltage NVSS. However, the low-side transistor 12 need not always be turned off as far as at least the high-side transistor 11 is forcibly turned off. In such a case, there is no need to use a configuration that turns off the low-side transistor. Further, the high-side transistor 11 and the low-side transistor 12 may be formed over a one-chip semiconductor substrate.

What is claimed is:

1. A power conversion circuit comprising:
    a normally-off, high-side transistor and a normally-on, low-side transistor that are series-coupled to each other to form a half-bridge circuit;
    a first drive circuit which drives a gate of the high-side transistor; and
    a second drive circuit which drives a gate of the low-side transistor,
    wherein the first drive circuit controls switching of the high-side transistor in accordance with an input pulse width modulation (PWM) signal when a first power supply voltage for the second drive circuit is lower than a first reference voltage, and the first drive circuit turns off the high-side transistor when the first power supply voltage for the second drive circuit is higher than the first reference voltage, and
    wherein the second drive circuit outputs a drive signal to the gate of the low-side transistor in accordance with the first power supply voltage, which is supplied as a low-potential power supply voltage.

2. The power conversion circuit according to claim 1, further comprising:
    a negative voltage source that generates the first power supply voltage in accordance with a second power supply voltage and a ground voltage.

3. The power conversion circuit according to claim 1, further comprising:

a control circuit which outputs a first logic level when the first power supply voltage is lower than the first reference voltage, and outputs a second logic level when the first power supply voltage is higher than the first reference voltage, and wherein the first drive circuit supplies a drive signal to the gate of the high-side transistor in accordance with the second logic level, which is output from the control circuit, and turns off the high-side transistor.

4. The power conversion circuit according to claim 1,
wherein the first drive circuit outputs a drive signal to the gate of the high-side transistor in accordance with a second power supply voltage for the first drive circuit, which is supplied as a high-potential power supply voltage, and wherein the first drive circuit turns off the high-side transistor when the second power supply voltage is lower than a second reference voltage.

5. The power conversion circuit according to claim 4, further comprising:
a control circuit which outputs a first logic level when the second power supply voltage is higher than a second reference voltage, and outputs a second logic level when the first power supply voltage is higher than the second reference voltage, and wherein the first drive circuit supplies a drive signal to the gate of the high-side transistor in accordance with the second logic level, which is output from the control circuit, and turns off the high-side transistor.

6. The power conversion circuit according to claim 1,
wherein the second drive circuit controls the switching operation of the low-side transistor in accordance with the input PWM signal when a second power supply voltage for the first drive circuit is higher than a second reference voltage, and the second drive circuit turns off the low-side transistor when the second power supply voltage is lower than the second reference voltage.

7. The power conversion circuit according to claim 6,
wherein the second drive circuit outputs a drive signal to the gate of the low-side transistor in accordance with the first power supply voltage, and wherein the second drive circuit turns off the low-side transistor when the first power supply voltage is higher than the first reference voltage.

8. The power conversion circuit according to claim 7, further comprising:
a control circuit which outputs a first logic level when the first power supply voltage is lower than the first reference voltage, and outputs a second logic level when the first power supply voltage is higher than the first reference voltage, wherein the first drive circuit supplies a drive signal to the gate of the high-side transistor in accordance with the second logic level, which is output from the control circuit, and turns off the high-side transistor, and wherein the second drive circuit supplies a drive signal to the gate of the low-side transistor in accordance with the second logic level, which is output from the control circuit, and turns off the low-side transistor.

9. The power conversion circuit according to claim 6,
wherein the first drive circuit outputs a drive signal to the gate of the high-side transistor in accordance with the second power supply voltage supplied as a high-potential power supply voltage, and wherein, when the second power supply voltage is lower than the second reference voltage, the first drive circuit turns off the high-side transistor; and wherein the second drive circuit turns off the low-side transistor when the second power supply voltage is lower than the second reference voltage.

10. The power conversion circuit according to claim 9, further comprising:
a control circuit which outputs a first logic level when the second power supply voltage is higher than the second reference voltage, and outputs a second logic level when the first power supply voltage is higher than the second reference voltage, wherein the first drive circuit supplies a drive signal to the gate of the high-side transistor in accordance with the second logic level, which is output from the control circuit, and turns off the high-side transistor, and wherein the second drive circuit supplies a drive signal to the gate of the low-side transistor in accordance with the second logic level, which is output from the control circuit, and turns off the low-side transistor.

11. The power conversion circuit according to claim 10, wherein the control circuit controls the operation of the second drive circuit using a signal level-shifted to the operating voltage range of the second drive circuit.

12. The power conversion circuit according to claim 1, wherein the high-side transistor and the low-side transistor are n-channel GaN power transistors.

13. The power conversion circuit according to claim 1, wherein the high-side transistor, the low-side transistor, and the two drive circuits are resin-sealed to form a single semiconductor device.

14. A multiphase voltage regulator comprising:
a plurality of power conversion circuits; and
a power supply controller that outputs a plurality of pulse width modulation (PWM) signals to the power conversion circuits, wherein the power conversion circuits are parallel-coupled to a load through a plurality of output coils, and wherein each of the power conversion circuits comprises:
a normally-off, high-side transistor and a normally-on, low-side transistor that are series-coupled to each other to form a half-bridge circuit;
a first drive circuit which drives a gate of the high-side transistor; and
a second drive circuit which drives a gate of the low-side transistor, wherein the first drive circuit controls switching of the high-side transistor in accordance with one of the PWM signals when a first power supply voltage for the second drive circuit is lower than a first reference voltage, and the first drive circuit turns off the high-side transistor when the first power supply voltage for the second drive circuit is higher than the first reference voltage, and wherein the second drive circuit outputs a drive signal to the gate of the low-side transistor in accordance with the first power supply voltage, which is supplied as a low-potential power supply voltage.

15. A power conversion method comprising the steps of:
providing a normally-off, high-side transistor and a normally-on, low-side transistor that are series-coupled to each other to form a half-bridge circuit, a first drive circuit which drives a gate of the high-side transistor, and a second drive circuit which drives a gate of the low-side transistor;

when a first power supply voltage for the second drive circuit is lower than a first reference voltage, the first drive circuit controls switching of the high-side transistor in accordance with an input pulse width modulation (PWM) signal; and when the first power supply voltage for the second drive circuit is higher than the first reference voltage, the first drive circuit turns off the high-side transistor, wherein the second drive circuit outputs a drive signal to the gate of the low-side transistor in accordance with the first power supply voltage, which is supplied as a low-potential power supply voltage.

16. The power conversion method according to claim 15, further comprising the steps of:

when a second power supply voltage for the first drive circuit is lower than a second reference voltage, the first drive circuit turns off the high-side transistor and the second drive circuit turns off the low-side transistor; and when the second power supply voltage for the first drive circuit is higher than the second reference voltage, the second drive circuit controlls the switching operation of the low-side transistor in accordance with the input PWM signal, wherein the second power supply voltage is supplied as a high-potential power supply voltage.

* * * * *